United States Patent
Kurihara et al.

(10) Patent No.: US 11,208,931 B2
(45) Date of Patent: Dec. 28, 2021

(54) EXHAUST GAS PURIFICATION CATALYST

(71) Applicants: Mitsui Mining & Smelting Co., Ltd., Tokyo (JP); HONDA MOTOR CO., LTD., Tokyo (JP)

(72) Inventors: Hiroki Kurihara, Saitama (JP); Yusuke Nagai, Saitama (JP); Shingo Akita, Saitama (JP); Yoshinori Endo, Saitama (JP); Takeshi Mori, Saitama (JP); Takayuki Watanabe, Saitama (JP); Tomoko Tsuyama, Saitama (JP)

(73) Assignees: Mitsui Mining & Smelting Co., Ltd., Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/046,517

(22) PCT Filed: Apr. 17, 2019

(86) PCT No.: PCT/JP2019/016526
§ 371 (c)(1),
(2) Date: Oct. 9, 2020

(87) PCT Pub. No.: WO2020/039649
PCT Pub. Date: Feb. 27, 2020

(65) Prior Publication Data
US 2021/0164378 A1   Jun. 3, 2021

(30) Foreign Application Priority Data

Aug. 22, 2018 (JP) .............................. JP2018-155776

(51) Int. Cl.
*F01N 3/28* (2006.01)
*B01J 23/63* (2006.01)
(Continued)

(52) U.S. Cl.
CPC ............ *F01N 3/2821* (2013.01); *B01J 23/63* (2013.01); *B01J 35/04* (2013.01); *F01N 3/2828* (2013.01); *B01J 35/10* (2013.01)

(58) Field of Classification Search
CPC ...... F01N 3/2828; F01N 3/2821; B01J 35/10; B01J 35/04; B01J 23/63
(Continued)

(56) References Cited

U.S. PATENT DOCUMENTS 6,753,294 B1 * 6/2004 Brisley ................. F01N 3/0231
   502/439
8,080,208 B2 * 12/2011 Kim ...................... F01N 3/0222
   422/177

(Continued)

FOREIGN PATENT DOCUMENTS

EP    3207989 A1   8/2017
JP    2008-253961 A   10/2008
(Continued)

OTHER PUBLICATIONS

International Search Report (ISR) dated Jul. 23, 2019 filed in PCT/JP2019/016526.

*Primary Examiner* — Tom P Duong
(74) *Attorney, Agent, or Firm* — Rankin, Hill & Clark LLP

(57) ABSTRACT

In an exhaust gas purifying catalyst according to the present invention, a substrate includes inflow-side cells, outflow-side cells, and porous partition walls, each partition wall separating the inflow-side cell from the outflow-side cell. Catalyst portions include: first catalyst portions, each first catalyst portion being provided on a surface of the partition wall that faces the inflow-side cell on an upstream side in an exhaust gas flow direction, and second catalyst portions, each second catalyst portion being provided on a surface of the partition wall that faces the outflow-side cell on a (Continued)

downstream side, and the exhaust gas purifying catalyst satisfies the following expressions:
$I_{B1}/I_A \times 100 \geq 60\%$, $I_{B2}/I_A \times 100 \geq 60\%$, $I_{C1}/I_A \times 100 \geq 3\%$, and $I_{C2}/I_A \times 100 \geq 3\%$, where $I_A$, $I_{B1}$, $I_{B2}$, $I_{C1}$, and $I_{C2}$ represent pore volumes, definitions of which can be found in the specification.

5 Claims, 3 Drawing Sheets

(51) Int. Cl.
  *B01J 35/04* (2006.01)
  *B01J 35/10* (2006.01)
(58) Field of Classification Search
  USPC .............................. 422/180; 428/116; 55/523
  See application file for complete search history.

(56) References Cited

U.S. PATENT DOCUMENTS

| | | | | |
|---|---|---|---|---|
| 8,722,000 | B2* | 5/2014 | Boorse | F01N 3/0222 423/213.2 |
| 10,159,934 | B2* | 12/2018 | Kitamura | B01D 53/94 |
| 2007/0204580 | A1* | 9/2007 | Kunieda | C04B 38/0006 55/523 |
| 2008/0070776 | A1* | 3/2008 | Yamaguchi | F01N 3/0222 502/100 |
| 2009/0011919 | A1* | 1/2009 | Noguchi | C04B 35/195 501/80 |
| 2009/0291253 | A1* | 11/2009 | Ohno | B01J 29/072 428/116 |
| 2010/0061900 | A1 | 3/2010 | Watanabe et al. | |
| 2010/0275579 | A1 | 11/2010 | Klingmann et al. | |
| 2012/0064286 | A1* | 3/2012 | Hirose | C04B 38/0009 428/116 |
| 2012/0304623 | A1 | 12/2012 | Springer et al. | |
| 2014/0356265 | A1 | 12/2014 | Chen et al. | |
| 2015/0209760 | A1* | 7/2015 | Asanuma | B01J 35/023 502/304 |
| 2016/0271549 | A1* | 9/2016 | Kikuchi | C04B 35/66 |
| 2017/0284246 | A1* | 10/2017 | Kimura | B32B 3/12 |
| 2017/0296969 | A1 | 10/2017 | Ohashi et al. | |
| 2018/0038252 | A1 | 2/2018 | Yang et al. | |
| 2018/0214810 | A1* | 8/2018 | Iida | B01D 53/944 |
| 2018/0347425 | A1 | 12/2018 | Otsuka et al. | |
| 2019/0120104 | A1 | 4/2019 | Inoda et al. | |
| 2021/0001315 | A1 | 1/2021 | Kurihara et al. | |

FOREIGN PATENT DOCUMENTS

| | | |
|---|---|---|
| JP | 2010-540217 A | 12/2010 |
| JP | 2011-104524 A | 6/2011 |
| JP | 2015-25435 A | 2/2015 |
| JP | 2016-78016 A | 5/2016 |
| JP | 2016-527427 A | 9/2016 |
| JP | 2017-185464 A | 10/2017 |
| JP | 2018-51442 A | 4/2018 |
| JP | 2018-513784 A | 5/2018 |
| WO | 2017/051458 A1 | 3/2017 |

* cited by examiner

EXHAUST GAS PURIFICATION CATALYST

TECHNICAL FIELD

The present invention relates to an exhaust gas purifying catalyst.

BACKGROUND ART

For internal combustion engines including gasoline engines, gasoline direct injection engines (hereinafter also referred to as GDI engines) are now widely used in order to comply with fuel economy standards becoming stricter year by year. It is known that GDI engines have low fuel consumption and provide high output, but that the amount of particulate matter (hereinafter also referred to as PM; including soot) emitted in exhaust gas is 5 to 10 times or more higher than that of conventional port fuel injection engines. In order to comply with environmental restrictions for PM emission, vehicles mounted with a gasoline engine such as a GDI engine are also required to include a filter that has a function for collecting PM (gasoline particulate filter, hereinafter also referred to as GPF), as with diesel engine-mounted vehicles.

In general, the space for installing an exhaust gas purifying catalyst is limited, and thus an exhaust gas purifying catalyst has come into use in recent years that includes a filter as described above and a noble metal three-way catalyst such as Pd, Pt, or Rh supported on the filter to collect PM and purify nitrogen oxide ($NO_x$), carbon monoxide (CO), carbon hydride (HC), and the like.

For example, Patent Literature 1 discloses an exhaust gas purifying catalyst that includes: a substrate of wall flow structure having an inlet cell in which only an exhaust gas inflow end section is open, an outlet cell adjacent to the inlet cell and in which only an exhaust gas outflow end section is open, and a porous partition wall that partitions the inlet cell and the outlet cell; an upstream catalyst layer provided inside the partition wall and disposed in an upstream portion of the substrate, in the direction of exhaust gas flow, including the exhaust gas inflow end section; and a downstream catalyst layer provided inside the partition wall and disposed in a downstream portion of the substrate, in the direction of exhaust gas flow, including the exhaust gas outflow end section, wherein the noble metal included in the upstream catalyst layer and the noble metal included in the downstream catalyst layer are different from each other.

CITATION LIST

Patent Literature

Patent Literature 1: US 2017296969A1

SUMMARY OF INVENTION

Technical Problem

However, a conventional filter catalyst having a wall flow structure does not have a sufficient PM collection rate.

It is an object of the present invention to provide an exhaust gas purifying catalyst having a PM collection rate higher than that of a conventional exhaust gas purifying catalyst.

Solution to Problem

The inventors of the present invention have conducted in-depth studies on the configuration for increasing the PM collection rate of a filter catalyst having a wall flow structure. As a result, they have found that when a filter catalyst including a substrate and catalyst layers formed thereon satisfies a specific relationship between the pore volume of the filter catalyst and the pore volume of the substrate itself, the filter catalyst can provide a high PM collection.

The present invention has been made based on the findings described above, and provides an exhaust gas purifying catalyst including: a substrate and catalyst portions provided in the substrate, the substrate including:
  inflow-side cells, each inflow-side cell being a space having an open end on an inflow side thereof and a closed end on an outflow side thereof in an exhaust gas flow direction;
  outflow-side cells, each outflow-side cell being a space having a closed end on an inflow-side thereof and an open end on an outflow-side thereof in the exhaust gas flow direction; and
  porous partition walls, each partition wall separating the inflow-side cell from the outflow-side cell, and
the catalyst portions including:
  (group A) first catalyst portions, each first catalyst portion being provided at least on a part of a surface of the partition wall that faces the inflow-side cell on an upstream side in the exhaust gas flow direction; and
  (group B) second catalyst portions, each second catalyst portion being provided at least on a part of a surface of the partition wall that faces the outflow-side cell on a downstream side in the exhaust gas flow direction, wherein a pore volume distribution with respect to a pore size satisfies the following expressions, as determined on the substrate and the catalyst:

$$I_{B1}/I_A \times 100 \geq 60(\%); I_{B2}/I_A \times 100 \geq 60(\%); I_{C1}/I_A \times 100 \geq 3 (\%) \text{ and } I_{C2}/I_A \times 100 \geq 3(\%),$$

wherein, $I_A$ represents a log differential pore volume of a maximum peak within a first range of a pore size of 10,000 to 100,000 nm, as determined on the partition walls of the substrate, $I_{B1}$ represents a log differential pore volume of a maximum peak within the first range, as determined on the first catalyst portions and the partition walls in a region in which the first catalyst portions of the catalyst are provided, $I_{B2}$ represents a log differential pore volume of a maximum peak within the first range, as determined on the second catalyst portions and the partition walls in a region in which the second catalyst portions of the catalyst are provided, $I_{C1}$ represents a log differential pore volume of a maximum peak within a second range of a pore size of 20 to 500 nm, as determined on the first catalyst portions and the partition walls in the region in which the first catalyst portions of the catalyst are provided, and $I_{C2}$ represents a log differential pore volume of a maximum peak within the second range, as determined on the second catalyst portions and the partition walls in the region in which the second catalyst portions of the catalyst are provided.

Advantageous Effects of Invention

According to the present invention, a filter catalyst having a wall flow structure and providing increased PM collection performance is provided.

DESCRIPTION OF EMBODIMENT

Hereinafter, the present invention will be described by way of a preferred embodiment thereof, but the present invention is not limited to the embodiment given below.

FIGS. 1 to 4 show an example of an exhaust gas purifying catalyst 10 according to the present embodiment. The drawings merely show a schematic example of an exhaust gas purifying catalyst, and are not intended to limit the present invention in any way.

The exhaust gas purifying catalyst 10 is provided in an exhaust path of an internal combustion engine such as a gasoline engine, in particular, a GDI engine for vehicles. The exhaust gas purifying catalyst 10 is used as, for example, a GPF.

Figure 1:
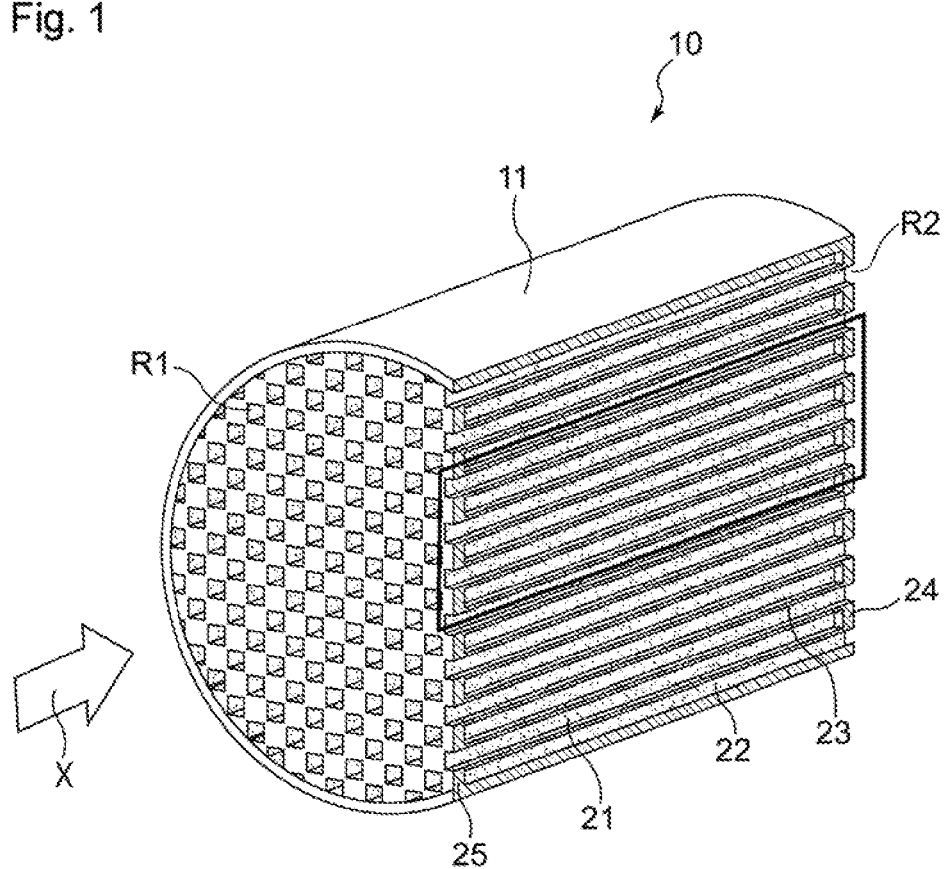
FIG. 1 is a schematic cross-sectional perspective view of an exhaust gas purifying catalyst according to an embodiment of the present invention.

As shown in FIG. 1, the exhaust gas purifying catalyst 10 includes a substrate 11 that has a so-called wall flow structure. As the substrate 11, a substrate made of any material can be used. For example, a substrate formed of ceramic such as cordierite or silicon carbide (SiC) can be favorably used. Usually, the substrate has a cylindrical outer shape as shown in FIG. 1, and is disposed in the exhaust path of the internal combustion engine such that the axis direction of the cylindrical outer shape substantially matches an exhaust gas flow direction X. FIG. 1 shows a substrate that has a cylindrical outer shape. However, the outer shape of the substrate as a whole may be an elliptic cylindrical shape or a polygonal cylindrical shape, instead of a cylindrical shape.

As shown in FIG. 1, the substrate 11 includes inflow-side cells 21 and outflow-side cells 22. Each inflow-side cell 21 is a space, the space extending in the exhaust gas flow direction X and having an open end on the inflow side thereof and a closed end on the outflow side thereof in the flow direction X. Each outflow-side cell 22 is a space, the space extending in the flow direction X and having a closed end on the inflow side thereof and an open end on the outflow side thereof in the flow direction X.

The inflow-side cell 21 is closed by a sealing portion 24 at the end on the exhaust gas outflow-side in a downstream end portion R2 in the exhaust gas flow direction X, but is open at the end on the exhaust gas inflow-side in an upstream end portion R1. The outflow-side cell 22 is closed by a sealing portion 25 at the end on the exhaust gas inflow-side in the upstream end portion R1, but is open at the end on the exhaust gas outflow-side in the downstream end portion R2. The inflow-side cell 21 and the outflow-side cell 22 are configured such that a gas, a liquid, and the like can flow through an opening end (hereinafter also referred to as "opening"), but the flow of exhaust gas is blocked at the sealing portion 24 and the sealing portion 25, which are closed portion. The inflow-side cell 21 and the outflow-side cell 22 are each a space having the shape of a hole with a bottom and extending in the axis direction of the substrate 11. The cross-sectional shape of each of the inflow-side cell 21 and the outflow-side cell 22 on a cross section perpendicular to the axis direction of the substrate 11 may be any geometric shape such as a quadrilateral including a square, a parallelogram, a rectangle, and a trapezoid, a polygon including a triangle, a hexagon, an octagon, a circular shape, and an elliptic shape.

A porous partition wall 23 is formed between an inflow-side cell 21 and an outflow-side cell 22 that is provided adjacent to the inflow-side cell 21 so as to divide the inflow-side cell 21 and the outflow-side cell 22. The inflow-side cell 21 and the outflow-side cell 22 are separated by the partition wall 23. The partition wall 23 serves as an inner-side wall of the bottomed porous inflow-side cell 21 and outflow-side cell 22. The partition wall 23 has a porous structure to allow a gas such as exhaust gas to pass therethrough. The thickness of the partition wall 23 is preferably 150 μm to 400 μm, for example. As used herein, the term "thickness" refers to the thickness of a thinnest portion when the partition wall 23 between the inflow-side cell 21 and the outflow-side cell 22 does not have a uniform thickness.

In the substrate 11, the opening of the inflow-side cell 21 at the inflow-side end portion R1 and the opening of the outflow-side cell 22 at the outflow-side end portion R2 may have the same area or different areas. As used herein, the area of the opening refers to the area of a plane that is perpendicular to the axis direction of the substrate 11.

Figure 2:
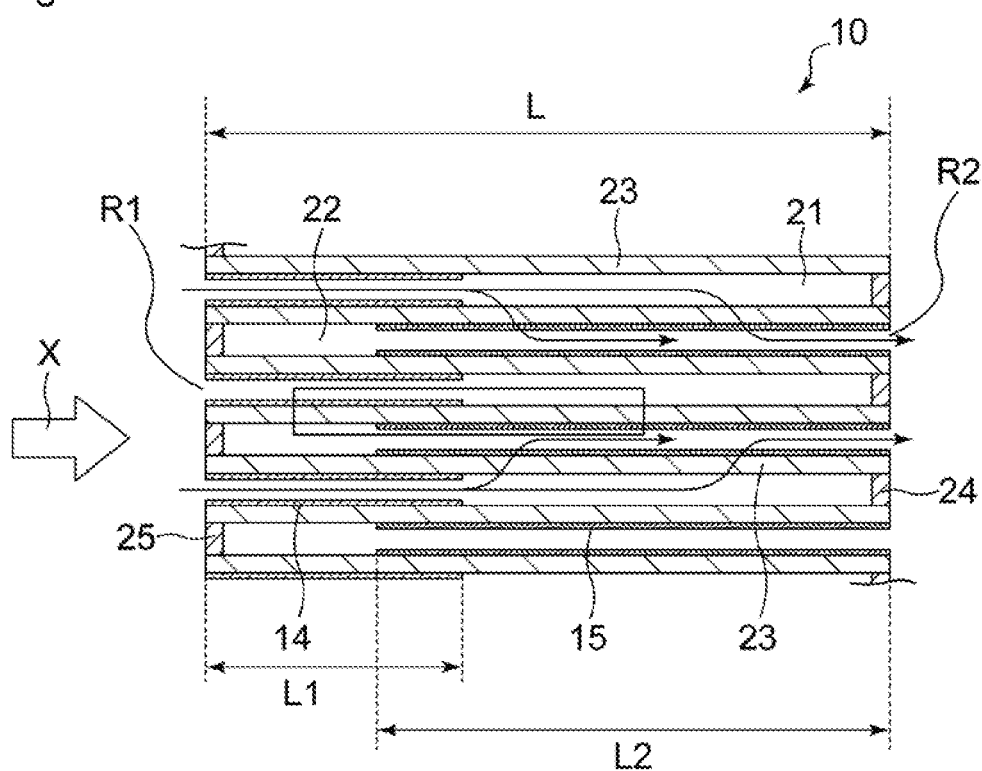
FIG. 2 is a cross section of a portion surrounded by a rectangle in FIG. 1, taken along the axis direction of a substrate.

In the substrate 11, catalyst portions containing a catalytically active component are provided. As shown in FIG. 2, the catalyst portions include first catalyst portions 14 (hereinafter also referred to as "first catalyst layers 14"), each first catalyst portion 14 being in the form of a layer and provided at least on the upstream side in the exhaust gas flow direction X (hereinafter also referred to as "X direction") on the surface of the partition wall 23 that faces the inflow-side cell 21 (herein, the first catalyst portions are also collectively referred to as group A), and second catalyst portions 15 (hereinafter also referred to as "second catalyst layers 15"), each second catalyst portion 15 being in the form of a layer and provided at least on the downstream side in the exhaust gas flow direction X on the surface of the partition wall 23 that faces the outflow-side cell 22 (herein, the second catalyst portions are also collectively referred to as group B).

The inventors of the present invention have determined a pore volume distribution of the exhaust gas purifying catalyst 10 and compared a peak pore volume derived from the partition walls of the substrate and a peak pore volume derived from both the partition walls of the substrate and each catalyst layer. As a result, they have found that PM collection performance can be effectively improved when the ratio between these peak pore volumes is within a specific range with peak pore volumes derived from the catalyst-supporting component contained in respective catalyst layers of a predetermined value or more. In the present embodiment, the catalyst-supporting component is metal oxide particles, a detailed description of which will be given later.

Specifically, the exhaust gas purifying catalyst 10 satisfies the following expressions when a log differential pore volume distribution is determined:

$I_{B1}/I_A \times 100 \geq 60\%$;

$I_{B2}/I_A \times 100 \geq 60\%$;

$I_{C1}/I_A \times 100 \geq 3\%$; and $I_{C2}/I_A \times 100 \geq 3\%$ wherein, $I_A$ represents the log differential pore volume of the maximum peak within a first range of a pore size of 10,000 to 100,000 nm, as determined on the partition walls of the substrate, $I_{B1}$ represents the log differential pore volume of the maximum peak within the first range, as determined on the first catalyst portions and the partition walls in a portion in which the first catalyst portions of the catalyst are provided, $I_{B2}$ represents the log differential pore volume of the maximum peak within the first range, as determined on the second catalyst portions and the partition walls in a portion in which the second catalyst portions of the catalyst are provided.

$I_{C1}$ represents the log differential pore volume of the maximum peak within a second range of a pore size of 20 to 500 nm, as determined on the first catalyst portions and the partition walls in a portion in which the first catalyst portions of the catalyst are provided, and $I_{C2}$ represents the log differential pore volume of the maximum peak within the second range, as determined on the second catalyst portions and the partition walls in a portion in which the second catalyst portions of the catalyst are provided.

$I_A$ is a value determined on the partition walls of the substrate in which the catalyst portions are not formed. Usually, a wall flow type substrate for GPF has a pore volume peak derived from the partition walls within a first range of a pore size of 10,000 to 100,000 nm in a differential pore volume distribution, which is determined by differentiating the cumulative pore volume. Here, catalyst layers formed on partition walls may be divided into two types, specifically, a catalyst layer that is formed to cover surfaces of pores of the partition wall while permeating into the pores of the partition wall, and a catalyst layer that is formed on an outer surface of the partition wall without permeating into the pores of the partition wall. With respect to the catalyst layers, as the amount of the catalyst layers that have permeated into the pores increases, the pore volume derived from the pores that have a pore size derived from the substrate decreases, and thus the value of $I_{B1}/I_A \times 100$ and the value of $I_{B2}/I_A \times 100$ will decrease. In short, the amount of the catalyst layers that have permeated into the pores can be estimated by determining the value of $I_{B1}/I_A \times 100$ and the value of $I_{B2}/I_A \times 100$.

$I_{C1}$ and $I_{C2}$ described above are each the intensity of a peak derived from the pores of the catalyst-supporting component (metal oxide particles, which will be described later) of the catalyst layer (the log differential pore volume of the maximum peak within a second range of a pore size of 20 to 500 nm). Usually, as the amount of the catalyst layers formed or the amount of catalyst-supporting component in the catalyst layers increases, the value of $I_{C1}/I_A \times 100$ and the value of $I_{C2}/I_A \times 100$ increase. In short, the amount of the catalyst layers formed can be estimated by determining the value of $I_{C1}/I_A \times 100$ and the value of $I_{C2}/I_A \times 100$.

According to the present embodiment, in the exhaust gas purifying catalyst 10, the value of $I_{B1}/I_A \times 100$ and the value of $I_{B2}/I_A \times 100$ are each 60% or more, and the value of $I_{C1}/I_A \times 100$ and the value of $I_{C2}/I_A \times 100$ are each 3% or more. Due to such features, the resulting exhaust gas purifying catalyst 10 of the present embodiment can be controlled to satisfy the condition that the amounts of the first catalyst layers 14 and the second catalyst layers 15 formed therein are each a certain value or more, and also the condition that the amounts of the first catalyst layers 14 and the second catalyst layers 15 that are present within the partition walls of the substrate are each a certain value or less. The inventors of the present invention consider that, in the catalyst of the present invention, which satisfies the parameters described above, the first catalyst layers 14 and the second catalyst layers 15 each having a pore size effective for collecting PM are present on the surfaces of the partition walls in appropriate amounts, and that thus the PM collection rate can be increased. Furthermore, when the first catalyst layers 14 and the second catalyst layers 15 are present on the surfaces of the partition walls in appropriate amounts, the exhaust gas passing through the exhaust gas purifying catalyst 10 can easily come into contact with the first catalyst layers 14 and the second catalyst layers 15, and thus exhaust gas purification performance can also be increased.

In view of easily collecting PM by the first catalyst layer 14 to increase the PM collection rate as well as easily bringing exhaust gas into contact with the first catalyst layer 14 to increase the exhaust gas purification performance, the value of $I_{C1}/I_A \times 100$ is preferably 4% or more, more preferably 4.5% or more, even more preferably 6% or more, and even much more preferably 8% or more. Also, in view of adhesion between catalyst layers, the value of $I_{C1}/I_A \times 100$ is preferably 15% or less, and more preferably 10% or less.

In view of easily collecting PM by the second catalyst layer 15 to increase the PM collection rate as well as easily bringing exhaust gas into contact with the second catalyst layer 15 to increase the exhaust gas purification performance, the value of $I_{C2}/I_A \times 100$ is preferably 4% or more, more preferably 4.5% or more, even more preferably 6% or more, and even much more preferably 8% or more. In view of adhesion between catalyst layers, the value of $I_{C2}/I_A \times 100$ is preferably 15% or less, and more preferably 10% or less.

In view of increasing the PM collection rate and the exhaust gas purification performance, the value of $I_{B1}/I_A \times 100$ is preferably 70% or more, more preferably 80% or more, and even more preferably 90% or more.

In view of increasing the PM collection rate and the exhaust gas purification performance, the value of $I_{B2}/I_A \times 100$ is preferably 60% or more, more preferably 80% or more, and even more preferably 90% or more.

Furthermore, in view of appropriately balancing the amounts of the first catalyst layers 14 and the second catalyst layers 15 formed and the pore volume distribution so as to further increase the PM collection performance and the exhaust gas purification performance of the exhaust gas purifying catalyst 10 as a whole while further suppressing pressure loss, the value of $I_{B1}/I_{B2} \times 100$ is preferably 75% or more and 135% or less, and more preferably 90% or more and 110% or less.

It is particularly preferable that the exhaust gas purifying catalyst 10 have the following configuration.

In the flow direction X, the catalyst 10 includes a first region in which the first catalyst portions are provided on the partition walls and any second catalyst portion are not provided, and a second region in which the second catalyst portions are provided on the partition walls and any first catalyst portion are not provided. $I_{B1}$ and $I_{C1}$ are determined on the first catalyst portions and the partition walls in the first region in the catalyst, $I_{B2}$ and $I_{C2}$ are determined on the second catalyst portions and the partition walls in the second region in the catalyst, and at least one of $I_{C1}/I_A \times 100$ and $I_{C2}/I_A \times 100$ is 4.5(%) or more.

The first region and the second region provided as described above can reduce pressure loss as compared with, for example, a configuration in which the catalyst portions are provided entirely on surfaces of the partition walls that face the inflow-side cell and surfaces of the partition walls that face the outflow-side cell. As described above, the present invention can provide the PM collection performance enhanced to a high level while reducing pressure loss. In view of this, it is more preferable that both $I_{C1}/I_A \times 100$ and $I_{C2}/I_A \times 100$ be 4.5(%) or more.

$I_{B1}$ and $I_{C1}$ can be determined on according to the following method on samples obtained by cutting a portion (the first region) in which the first catalyst layers 14 are formed on the partition walls 23 but any second catalyst layer 15 are not formed. $I_{B2}$ and $I_{C2}$ can be determined on according to the following method on samples obtained by cutting a portion (the second region) in which the second catalyst layers 15 are formed on the partition walls 23 but any first catalyst layer 14 are not formed. $I_A$ can be determined on according to the following method on samples obtained by cutting a substrate 11 in which the catalyst portions are not formed on the partition walls 23. Alternatively, even from the substrate 11 in which the catalyst portions have been formed, $I_A$ can be determined on according to the following method on samples obtained by cutting a portion of the substrate 11 in which any catalyst portions are not formed.

A specific method for preparing samples is, for example, as described below. When cutting the partition walls of the substrate, the partition walls are preferably cut along a cross section perpendicular to the axis direction of the substrate 11.

Preparation of samples for determining $I_{B1}$ and $I_{C1}$: 1 cm³ cubes (cubes with each side having a length of 1 cm) are cut out at a position spaced apart from the upstream end portion R1 of the substrate by a distance corresponding to 10% of the overall length L.

Preparation of samples for determining $I_{B2}$ and $I_{C2}$: 1 cm³ cubes (cubes with each side having a length of 1 cm) are cut out at a position spaced apart from the downstream end portion R2 of the substrate by a distance corresponding to 10% of the overall length L.

The number of samples: five samples are prepared to determine $I_{B1}$ and $I_{C1}$, and five samples are prepared to determine $I_{B2}$ and $I_{C2}$.

Preparation of samples for determining $I_A$: From a substrate before the catalyst portion is formed or a portion of a substrate in which the catalyst portions are not formed, a total of ten samples are prepared. Among the ten samples, five samples are those obtained by cutting out 1 cm³ cubes (cubes with each side having a length of 1 cm) at a position spaced apart from the upstream end portion R1 by a distance corresponding to 10% of the overall length L, and other five samples are those obtained by cutting out 1 cm³ cubes (cubes with each side having a length of 1 cm) at a position spaced apart from the downstream end portion R2 of the substrate by a distance corresponding to 10% of the overall length L.

In the present embodiment, the term "pore volume distribution" refers to a log differential pore volume distribution. The log differential pore volume distribution is determined based on a mercury intrusion porosimetry according to JIS R 1655:2003. To be specific, a cut-out sample is dried at 150° C. for one hour as needed, and thereafter the pore volume of the sample is measured at room temperature using a mercury intrusion porosimeter for determining pore volume distribution. The mercury intrusion pressure is set to 0.0048 MPa at the start of measurement, and the maximum mercury intrusion pressure is set to 255.106 MPa. Pore volume is measured at a total of 131 pressure points including these values. On each point, pressure application is maintained for 10 seconds.

In a pore volume distribution obtained by determining $I_{B1}$ and $I_{C1}$, for example, it is typically preferable that the maximum peak in a measurement range of a pore size of 1 to 1,000,000 nm be observed within a first range of 10,000 to 100,000 nm, and it is also preferable that the maximum peak in a measurement range of a pore size of 1 to 1,000 nm, in particular, 1 to 2,000 nm be observed within a second range of 20 to 500 nm. Furthermore, a peak may also be observed in a range of 2,000 to 10,000 nm. The peak in a range of 2,000 to 10,000 nm is derived mainly from the gaps between metal oxide particles such as those of alumina that form the first catalyst layer 14.

In a pore volume distribution obtained by determining $I_{B2}$ and $I_{C2}$, for example, it is typically preferable that the maximum peak in a measurement range of a pore size of 1 to 1,000,000 nm be observed within a first range of 10,000 to 100,000 nm, and it is also preferable that the maximum peak in a range of 1 to 1,000 nm, in particular, a range of 1 to 2,000 nm be observed within a second range of 20 to 500 nm. Furthermore, a peak may also be observed in a range of 2,000 to 10,000 nm. The peak in a range of 2,000 to 10,000 nm is derived mainly from the gaps between metal oxide particles such as those of alumina that form the second catalyst layer 15.

In order to achieve preferable numerical values of $I_{B1}/I_A \times 100$, $I_{B2}/I_A \times 100$, $I_{C1}/I_A \times 100$, $I_{C2}/I_A \times 100$, and $I_{B2}/I_B \times 100$ described above, the type and particle size of metal oxide particles as a catalyst-supporting component for the first catalyst layer 14 and the second catalyst layer 15, the amount of coating of the first catalyst layer 14 and the second catalyst layer 15, and others may be tailored.

The first catalyst layer 14 and the second catalyst layer 15 may contain the same catalytically active component or different catalytically active components. Examples of the catalytically active components include platinum group metals. Specifically, one or more selected from platinum (Pt), palladium (Pd), rhodium (Rh), ruthenium (Ru), iridium (Ir), and osmium (Os) can be used. In view of exhaust gas purification performance, it is preferable that the catalytically active components contained in the first catalyst layer 14 and the second catalyst layer 15 be each independently at least one selected from platinum (Pt), palladium (Pd), and rhodium (Rh). It is particularly preferable that the second catalyst layer 15 contain a catalytically active component different from the catalytically active component contained in the first catalyst layer 14 as the catalytically active component. For example, it is particularly preferable that the first catalyst layer 14 contain a noble metal that is selected from platinum (Pt), palladium (Pd), and rhodium (Rh), and simultaneously that the second catalyst layer 15 contain a noble metal that is selected from platinum (Pt), palladium (Pd), and rhodium (Rh) but is different from the noble metal contained in the first catalyst layer 14, in view of efficiently purifying toxic exhaust gas components such as $NO_x$, CO, and HC. In particular, in view of enhancing $NO_x$ purification performance, it is more preferable that one of the first catalyst layer 14 and the second catalyst layer 15 contain rhodium (Rh), and it is even more preferable that, in particular, the first catalyst layer 14 contain rhodium (Rh).

The catalyst layers of at least one of group A (the first catalyst layers 14) and group B (the second catalyst layers 15) may have a stack structure composed of an upper layer and a lower layer. The upper layer and the lower layer may contain the same catalytically active component or different catalytically active components; however, it is preferable that the upper layer and the lower layer contain different catalytically active components. This configuration can purify $NO_x$, HC, and CO in a balanced manner at an increased PM collection rate while avoiding a reduction in the catalytic performance that occurs when a plurality of catalytically active components are contained in one layer. The first catalyst layer 14 and the second catalyst layer 15 may have an additional catalyst layer in the stack structure described above.

Figure 4:
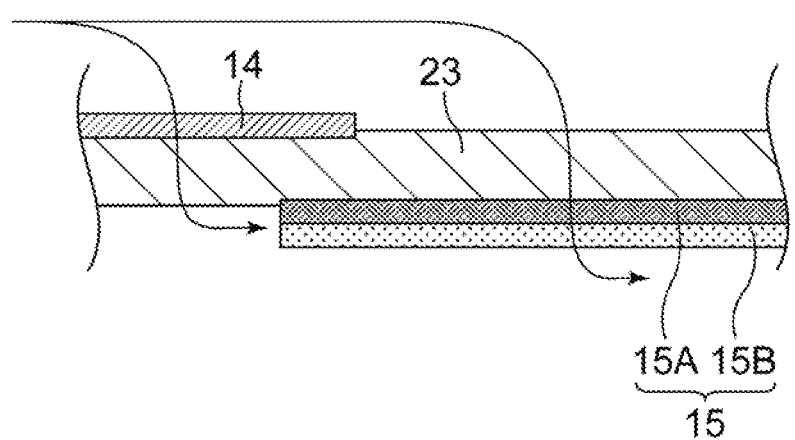
FIG. 4 is a view corresponding to FIG. 3 and showing a configuration of a second catalyst layer that is composed of two layers.

Particularly, as shown in FIG. 4, the exhaust gas purifying catalyst 10 is preferably configured such that each second catalyst layer 15 includes a lower layer 15A and an upper layer 15B, the lower layer 15A and the upper layer 15B containing catalytically active components that are different from each other.

The reason for this is as follows. As shown in FIG. 4, exhaust gas flowing from the inflow-side cell passes through the partition wall 23 and the first catalyst layer 14 located on the upstream side together, and then comes into contact with the surface of the second catalyst layer 15, or exhaust gas flowing from the inflow-side cell comes into contact with the surface of the first catalyst layer 14, and then passes through the partition wall 23 on the downstream side in the X direction than the region where the first catalyst layer 14 is present. A certain amount of components of the first catalyst layer 14 and the second catalyst layer 15, which satisfy $I_{B2}/I_A \times 100 \geq 60\%$ and $I_{C2}/I_A \times 100 \geq 3$, are present in the surfaces of the partition wall 23. Accordingly, the probability that exhaust gas comes into contact with the first catalyst layer 14 and the second catalyst layer 15 can be increased irrespective of which route the exhaust gas takes to go through the partition wall 23. Thus, the first catalyst layer 14 and the second catalyst layer 15 can efficiently purify exhaust gas. In particular, the second catalyst layer 15 that includes two layers containing different catalytically active components can more efficiently purify exhaust gas. Also, the first catalyst layer 14 satisfies $I_{B1}/I_A \times 100 \geq 60\%$ and $I_{C1}/I_A \times 100 \geq 3\%$, and thus it is considered that the probability that exhaust gas comes into contact with the first catalyst layer 14 is also high.

The lower layer 15A and the upper layer 15B are preferably in direct contact with each other, and the lower layer 15A is preferably in direct contact with the partition wall 23.

In particular, when the exhaust gas purifying catalyst 10 includes the first catalyst layers 14 that each contain rhodium (Rh) and the second catalyst layers 15 that each include a lower layer 15A that contains palladium (Pd) and an upper layer 15B that contains rhodium (Rh), the exhaust gas purifying catalyst 10 exhibits significantly excellent $NO_x$ purification performance due to the synergetic effect between the above described features, specifically $I_{B1}/I_A \times 100 \geq 60\%$, $I_{B2}/I_A \times 100 \geq 60\%$, $I_{C1}/I_A \times 100 \geq 3\%$, and $I_{C2}/I_A \times 100 \geq 3\%$, and the different catalytically active components contained in two layers of each second catalyst layer 15.

The reason for this is probably as follows: HC and CO oxidation by Pd can be facilitated by increasing the probability that the exhaust gas flowing into the exhaust gas purifying catalyst 10 comes into contact with the lower layer 15A of the second catalyst layer, and HC and CO oxidation by Pd and $NO_x$ reduction by Rh can be performed in a balanced manner by increasing the probability that the exhaust gas comes into contact with the upper layer 15B of the second catalyst layer. In addition, in the first catalyst layers 14 provided on the upstream side in the X direction and the upper layers 15B of the second catalyst layers provided on the downstream side in the X direction, rhodium (Rh), which has high $NO_x$ reduction capacity, can be provided over a wide range in the X direction of the catalyst. Accordingly, the exhaust gas purifying catalyst 10 can efficiently purify $NO_x$ over a wide range in the X direction. When the exhaust gas purifying catalyst 10 includes the first catalyst layers 14 that each contain rhodium (Rh) and the second catalyst layers 15 that each include a lower layer 15A that contains palladium (Pd) and an upper layer 15B that contains rhodium (Rh), the exhaust gas purifying catalyst 10 has excellent $NO_x$ purification performance particularly during high speed driving. Accordingly, the $NO_x$ emission amount can be effectively reduced by mounting a vehicle with the exhaust gas purifying catalyst 10.

In view of further improving the exhaust gas purification performance, the content of the catalytically active component(s) in the first catalyst layer 14 is preferably 0.001 mass % or more, more preferably 0.01 mass % or more, and even more preferably 0.05 mass % or more relative to the total amount of components contained in the first catalyst layer 14. With respect to the upper limit, the content is preferably 25 mass % or less, more preferably 20 mass % or less, and even more preferably 15 mass % or less in view of balancing exhaust gas purification performance and cost.

Likewise, in view of further improving the exhaust gas purification performance, the content of the catalytically active component(s) in the second catalyst layer 15 is preferably 0.001 mass % or more, more preferably 0.01 mass % or more, and even more preferably 0.05 mass % or more relative to the total amount of components contained in the second catalyst layer 15. With respect to the upper limit, the content is preferably 25 mass % or less, more preferably 20 mass % or less, and even more preferably 15 mass % or less in view of balancing exhaust gas purification performance and cost.

In view of further increasing the heat resistance of the exhaust gas purifying catalyst 10, the amount of the catalytically active component(s) contained in the first catalyst layer 14 is preferably roughly 0.01 g or more, and more preferably 0.05 g or more per liter of volume of the substrate. Also, the amount of the catalytically active component(s) contained in the second catalyst layer 15 is preferably roughly 0.01 g or more, and more preferably 0.05 g or more per liter of volume of the substrate.

With respect to the upper limit, the amount of the catalytically active component(s) contained in the first catalyst layer 14 and the second catalyst layer 15 per liter of volume of the substrate is preferably 10 g/L or less, and may be 5 g/L or less, or 3 g/L or less depending on the case.

As used herein, the volume of the substrate refers to an apparent volume, which includes not only the volume of the substrate portion but also the volumes of the first catalyst layers 14, the second catalyst layers 15, the pores of the partition walls 23, and the spaces in the cells 21 and 22.

In the case where each second catalyst layer 15 includes an upper layer 15B and a lower layer 15A, the amount of the catalytically active component(s) contained in the lower layer 15A is preferably 100 parts by mass or more and 5000 parts by mass or less, and more preferably 600 parts by mass or more and 3000 parts by mass or less relative to 100 parts by mass of the catalytically active component(s) contained in the upper layer 15B, in view of exhaust gas purification performance and the reduction in the total amount of noble metals. This range is particularly preferable when the exhaust gas purifying catalyst includes the first catalyst layers 14 that each contain rhodium (Rh), and the second catalyst layers 15 that each include a lower layer 15A that contains palladium (Pd) and an upper layer 15B that contains rhodium (Rh).

The amount of a catalytically active component can be determined by, for example, completely dissolving a catalyst layer to obtain a solution and measuring the amount of noble metals in the solution using ICP-AES.

In the case where a catalyst layer is included in the partition wall of the substrate, the amount of a catalytically active component can be determined by subtracting the amount of noble metals contained in a solution obtained by completely dissolving only the substrate from the amount of noble metals contained in a solution obtained by completely dissolving the catalyst layer and the substrate.

A preferred composition of the first catalyst layer 14 will be further described. It is preferable that the first catalyst layer 14 further contain a catalyst-supporting component, which supports the catalytically active component, in view of causing the catalytically active component to efficiently exhibit exhaust gas purification performance. Metal oxide particles may be used as the catalyst-supporting component. The metal oxide for forming the metal oxide particles may be an inorganic oxide that acts as an oxygen storage component (also referred to as "OSC material": wherein OSC stands for oxygen storage capacity), or an inorganic oxide other than the oxygen storage component. It is preferable that in the first catalyst layer 14, both the particles of an inorganic oxide that acts as an oxygen storage component and the particles of an inorganic oxide other than the oxygen storage component support the catalytically active component.

The term "metal oxide particles" used herein encompasses calcined bodies formed of metal oxide particles bonded to each other through calcining.

Herein, the expression "a catalytically active component is supported on metal oxide particles" means a state in which a catalytically active component is physically or chemically adsorbed or held on the outer surfaces of the metal oxide particles or the inner surfaces of the pores of the metal oxide particles. Specifically, whether a catalytically active component is supported on metal oxide particles can be confirmed by observation of metal oxide particles with the catalytically active component under, for example, a scanning electron microscope (SEM) and measuring the particle sizes thereof. For example, the average particle size of the catalytically active component present on the surface of the metal oxide particle is preferably 10% or less, more preferably 3% or less, and even more preferably 1% or less relative to the average particle size of the metal oxide particles. As used herein, the average particle size refers to the average feret diameter of 30 or more particles observed under an SEM.

As the inorganic oxide as an oxygen storage component, a metal oxide that is multivalent and is capable of storing oxygen can be used. Examples thereof include $CeO_2$ and CZ material (a ceria-zirconia composite oxide containing Ce and Zr, and a solid solution of $CeO_2$ and $ZrO_2$), iron oxide, and copper oxide. An oxide of a rare earth element other than Ce is also preferably used in view of thermal stability. Examples of the oxide of a rare earth element other than Ce include $Sc_2O_3$, $Y_2O_3$, $La_2O_3$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, and $Lu_2O_3$.

$CeO_2$—$ZrO_2$ herein refers to a solid solution of $CeO_2$ and $ZrO_2$, and whether or not a solid solution of $CeO_2$ and $ZrO_2$ has been formed can be confirmed by checking whether or not a single phase derived from $CeO_2$—$ZrO_2$ is formed, using an X-ray diffraction (XRD) apparatus. $CeO_2$—$ZrO_2$ may be a solid solution that also contains the oxide of a rare earth element other than Ce.

In particular, in view of the balance between heat resistance and OSC, and of easily controlling the value of $I_{C1}/I_A \times 100$ to be within the above-described range, the amount of $CeO_2$ contained in the first catalyst layer 14 is preferably 5 to 40 mass %, and more preferably 10 to 30 mass %. The amount of $ZrO_2$ contained in the first catalyst layer 14 is preferably 10 to 80 mass %, and more preferably 25 to 60 mass %. The preferred amounts of $CeO_2$ and $ZrO_2$ herein include the amounts of $CeO_2$ and $ZrO_2$ in the form of a solid solution, as well as the amount of Ce, in terms of $CeO_2$, in a ceria-zirconia composite oxide and the amount of Zr, in terms of $ZrO_2$, in a ceria-zirconia composite oxide, respectively.

The amounts of $CeO_2$ and $ZrO_2$ can be determined by, for example, completely dissolving the catalyst layer to obtain a solution, measuring the amounts of Ce and Zr contained in the solution using ICP-AES, and converting them to amounts in terms of oxide.

In the case where the catalyst layer is included in the partition wall of the substrate, the amounts of $CeO_2$ and $ZrO_2$ can be determined by subtracting the amounts of Ce and Zr in a solution obtained by completely dissolving only the substrate from the amounts of Ce and Zr contained in a solution obtained by completely dissolving the catalyst layers and the substrate.

The inorganic oxide other than the oxygen storage component that can be contained in the first catalyst layer 14 may be a metal oxide other than the oxygen storage component. Examples thereof include alumina, silica, silica-alumina, titanium, and aluminosilicate. In particular, alumina is preferably used in view of excellent heat resistance. The amount of the inorganic oxide other than the oxygen storage component contained in the first catalyst layer 14 is preferably 4 to 50 mass %, and more preferably 7 to 30 mass % in view of easily controlling the value of $I_{C1}/I_A \times 100$ to be within the above-described range.

The amount of alumina can be determined by, for example, completely dissolving the catalyst layer to obtain a solution, measuring the amount of aluminum contained in the solution using ICP-AES, and converting it to an amount in terms of oxide.

In the case where the catalyst layer is included in the partition wall of the substrate, the amount of alumina can be determined by subtracting the amount of Al contained in a solution obtained by completely dissolving only the substrate from the amount of Al contained in a solution obtained by completely dissolving the catalyst layer and the substrate.

A preferred composition of the second catalyst layer 15 will be further described. It is preferable that the second catalyst layer 15 further contain a catalyst-supporting component that supports the catalytically active component in view of causing the catalytically active component to efficiently exhibit exhaust gas purification performance. As the catalyst-supporting component, particles of an inorganic oxide that acts as an oxygen storage component, or particles of an inorganic oxide other than the oxygen storage component can be used, as with the metal oxide particles described for the first catalyst layer 14.

As the inorganic oxide as an oxygen storage component, those described for the inorganic oxide as an oxygen storage component for the first catalyst layer 14 can be used. Out of these, in particular, ceria or a ceria-zirconia composite oxide is preferably used because the resulting exhaust gas purifying catalyst can have high OSC. In particular, in view of the balance between heat resistance and OSC, and of easily controlling the value of $I_{C2}/I_A \times 100$ to be within the above-described range, the amount of $CeO_2$ contained in the second catalyst layer 15 is preferably 5 to 40 mass %, and more preferably 10 to 30 mass %. The amount of $ZrO_2$ contained in the second catalyst layer 15 is preferably 10 to 70 mass %, and more preferably 30 to 50 mass %. The preferred amounts of $CeO_2$ and $ZrO_2$ herein include the amounts of $CeO_2$ and $ZrO_2$ in the form of a solid solution.

As the inorganic oxide other than the oxygen storage component that can be contained in the second catalyst layer 15, those described for the inorganic oxide for the first catalyst layer 14 can be used. In particular, alumina is preferably used in view of excellent heat resistance. The amount of inorganic oxide other than the oxygen storage component in the second catalyst layer 15 is preferably 5 to 50 mass %, and more preferably 10 to 30 mass % in view of easily controlling the value of $I_{C2}/I_A \times 100$ to be within the above-described range.

Figure 3:
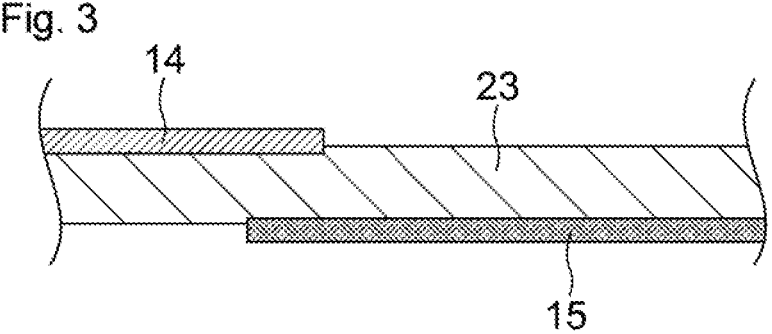
FIG. 3 is an enlarged view of a portion surrounded by a rectangle in FIG. 2.

In view of further improving PM collecting performance and exhaust gas purification performance during high speed driving, the first catalyst layer 14 is preferably present mainly on the surface of the partition wall 23, rather than the inside of the partition wall 23. As used herein, the expression "the first catalyst layer 14 is present mainly on the surface of the partition wall 23" means a state in which, in a cross section of the substrate 11 having the first catalyst layer 14, the mass of the first catalyst layer 14 present on the surface of the partition wall 23 of the substrate 11 is larger than the mass of the first catalyst layer 14 present inside the partition wall 23. For example, whether the first catalyst layer 14 is present mainly on the surface can be checked by observing a cross section of the partition wall where the first catalyst layer 14 is provided, under a scanning electron microscope (JEM-ARM200F available from JEOL, Ltd.), and performing energy dispersive X-ray spectrometry (EDS) to line-analyze the boundaries between elements (for example, Si and Mg) that are present only in the substrate and elements (for example, Ce and Zr) that are present only in the catalyst layer; or by performing an analysis on a cross section of the partition wall where the first catalyst portion 14 is provided using an electron probe micro analyzer (EPMA). Likewise, the second catalyst layer 15 is preferably present mainly on the surface of the partition wall 23, rather than the inside of the partition wall 23. FIGS. 3 and 4 each schematically show a state in which the first catalyst layer 14 is present mainly on the surface of the partition wall 23 and the second catalyst layer 15 is present mainly on the surface of the partition wall 23.

In the exhaust gas purifying catalyst 10 according to the present embodiment, as described above, the first catalyst layers 14 and the second catalyst layers 15 are provided such that they are present mainly on the surfaces of the partition walls 23, and the values of $I_{B1}/I_A \times 100$, $I_{B2}/I_A \times 100$, $I_{C1}/I_A \times 100$, and $I_{C2}/I_A \times 100$ are controlled to be within the above-described ranges. Accordingly, the first catalyst layers 14 and the second catalyst layers 15 are present on the surfaces of the partition walls in appropriate amounts effective for collecting PM, and thus the PM collection rate can be improved significantly. Furthermore, as a result of appropriate amounts of the first catalyst layers 14 and the second catalyst layers 15 being present on the surfaces of the partition walls, the exhaust gas passing through the exhaust gas purifying catalyst 10 can easily come into contact with the first catalyst layers 14 and the second catalyst layers 15, and thus the exhaust gas purification performance can also be improved.

Conventionally, an exhaust gas purifying catalyst is known in which catalyst layers are formed within partition walls of a substrate; however, in such an exhaust gas purifying catalyst in which catalyst layers are formed within partition walls, the effect of improving PM collection performance exhibited by the catalyst layers is low, which is therefore disadvantageous in terms of PM collection performance. In addition, in such an exhaust gas purifying catalyst in which catalyst layers are formed within a partition wall, it is difficult for the exhaust gas to come into contact with the first catalyst layer 14 and the second catalyst layer 15, which is also disadvantageous in terms of exhaust gas purification performance.

In contrast, as described above, in the exhaust gas purifying catalyst 10 of the present embodiment, the PM collection rate can be improved, and exhaust gas purification performance can also be improved.

The length L1 of the first catalyst layer 14 in the X direction (see FIG. 2) is preferably 10% to 80%, and more preferably 30% to 60% relative to the length L of the substrate 11 in the X direction (see FIG. 2), in view of increasing exhaust gas purification performance while reducing pressure loss and in view of favorable PM collection performance. Also, the length L2 of the second catalyst layer 15 in the X direction (see FIG. 2) is preferably 30% to 90%, and more preferably 50% to 80% relative to the length L of the substrate 11 in the X direction, in view of increasing exhaust gas purification performance while reducing pressure loss and in view of favorable PM collection performance. The first catalyst layer 14 is preferably formed to extend from the upstream end portion in the exhaust gas flow direction, and the second catalyst layer 15 is preferably formed to extend from the downstream end portion.

The total length of the length L1 of the first catalyst layer 14 in the X direction and the length L2 of the second catalyst layer 15 in the X direction, L1+L2, is preferably greater than the length L of the substrate 11 in the X direction, in view of improving exhaust gas purification performance, and (L1+L2)/L is preferably 1.05 or more, and more preferably 1.10 or more.

The first catalyst layer 14 and the second catalyst layer 15 may be single layers as shown in FIG. 3, or either one of the first catalyst layer 14 and the second catalyst layer 15 may include two or more layers as shown in FIG. 4. For example, the second catalyst layer 15 may include a lower layer 15A and an upper layer 15B. In this case, the lower layer 15A and the upper layer 15B both have a length corresponding to preferably 30% to 90%, and more preferably 50% to 80% relative to the length L of the substrate 11 in the X direction.

The lengths of the first catalyst layer 14 and the second catalyst layer 15 can be measured by the following preferable method: the exhaust gas purifying catalyst 10 is visually observed to identify the boundary of the first catalyst layer 14 and the boundary of the second catalyst layer 15; and the length of the first catalyst layer 14 and the length of the second catalyst layer 15 are measured. In this case, it is preferable to measure the length of the first catalyst layer 14 and the length of the second catalyst layer 15 at, for example, 10 arbitrarily selected positions on the exhaust gas purifying catalyst 10, and take the average values as the length of the first catalyst layer 14 and the length of the second catalyst layer 15. In the case where it is not possible to determine the boundaries of the first catalyst layer 14, the second catalyst layer 15, the lower layer 15A, and/or the upper layer 15B in the exhaust gas flow direction through visual observation, the composition is analyzed at a plurality of (for example, 8 to 16) positions in the exhaust gas flow direction of the exhaust gas purifying catalyst, and the lengths of the first catalyst layer 14 and the second catalyst layer 15 can be determined on the basis of the content of a catalytically active component in the composition at each position obtained. The content of a catalytically active component at each position can be determined through, for example, X-ray fluorescence analysis (XRF) or ICP emission spectroscopic analysis (ICP-AES).

The first catalyst layer 14 is preferably formed so as to extend from the upstream end portion R1 of the substrate 11 in the X direction toward the downstream side in view of both ease of production and exhaust gas purification performance. Likewise, the second catalyst layer 15 is preferably formed so as to extend from the downstream end portion R2 of the substrate 11 in the X direction toward the upstream side. Furthermore, in the case where the second catalyst layer 15 includes a lower layer 15A and an upper layer 15B as will be described later, the lower layer 15A and the upper layer 15B are preferably formed so as to extend from the downstream end portion R2 in the X direction of the substrate 11 toward the upstream side.

Next, a preferred method of producing an exhaust gas purifying catalyst according to the present invention will be described below.

The production method includes the following steps (1) and (2). Steps (1) and (2) may be performed in any order.
  (1) The step of applying a slurry for forming the first catalyst layer 14 containing a catalytically active component and metal oxide particles at least to a surface of a partition wall 23 that faces an inflow-side cell 21 on the upstream side in the X direction, and then drying or calcining the slurry.
  (2) The step of applying a slurry for forming the second catalyst layer 15 containing a catalytically active component and metal oxide particles at least to a surface of the partition wall 23 that faces an outflow-side cell 22 on the downstream side in the X direction, and then drying or calcining the slurry.

In the case where the second catalyst layer 15 includes two or more layers, for example, the following steps (2'-1) and (2'-2) are performed instead of step (2). The same applies to the case where the first catalyst layer 14 includes two layers.
  (2'-1) The step of applying a slurry for forming the lower layer containing a catalytically active component and metal oxide particles at least to a surface of the partition wall 23 that faces an outflow-side cell 22 on the downstream side in the X direction, and then drying or calcining the slurry.
  (2'-2) The step of applying a slurry for forming the upper layer containing a catalytically active component and metal oxide particles at least to a part of a portion where the slurry for forming the lower layer has been applied to the surface of the partition wall 23 that faces the outflow-side cell 22, and then drying or calcining the slurry.

As the metal oxide particles, the particles of an inorganic oxide as an oxygen storage component or the particles of an inorganic oxide other than the oxygen storage component, which have been described above as a constituent component of the first catalyst layer 14 and the second catalyst layer 15, can be used. The catalytically active component used in steps (1), (2), (2'-1), and (2'-2) may each be in a state of a water soluble salt such as a nitrate and thus be mixed with metal oxide particles to obtain a slurry for forming the first catalyst layer 14 and a slurry for forming the second catalyst layer 15, and the obtained slurries may be applied to the substrate 11, and then dried or calcined. Alternatively, the catalytically active component may be supported on metal oxide particles in advance, and the resulting metal oxide particles supporting the catalytically active component thereon may be used to form a slurry. For supporting a catalytically active component on metal oxide particles in advance, a method may be used in which the metal oxide particles are impregnated with an aqueous solution of the catalytically active component in a state of a water soluble salt, and then calcined at a temperature of 350 to 550° C.

The slurry for forming the first catalyst layer 14 used in step (1), the slurry for forming the second catalyst layer 15 used in step (2), the slurry for forming the upper layer used in step (2'-1), and the slurry for forming the lower layer used in step (2'-2) may contain a binder for the purpose of attaching the metal oxide particles supporting the catalytically active component to the substrate. Examples of the binder include an alumina sol, a zirconia sol, a titania sol, and a silica sol.

As the particle size of the metal oxide particles contained in the slurry for forming the first catalyst layer 14 used in step (1), the metal oxide particles contained in the slurry for forming the first catalyst layer 14 used in step (1) preferably have a particle size D50 of 1 μm or more and a particle size D90 of 7 m or more, and more preferably a particle size D50 of 2 μm or more and a particle size D90 of 15 μm or more, in view of easily controlling the value of $I_{B1}/I_A \times 100$ and the value of $I_{B2}/I_A \times 100$ to be within the above-described ranges. The value of $I_{B1}$ and $I_{B2}$ tends to increase as the particles sizes D50 and D90 of the metal oxide particles increase, and the value of $I_{B1}$ and $I_{B2}$ tends to decrease as the particles sizes D50 and D90 of the metal oxide particles decrease. Accordingly, by adjusting the particle sizes D50 and D90, the value of $I_{B1}/I_A \times 100$, the value of $I_{B2}/I_A \times 100$, and the value of $I_{B2}/I_{B1} \times 100$ can be controlled more appropriately. With respect to the upper limits of the particle sizes of the metal oxide particles contained in the slurry for forming the first catalyst layer 14 used in step (1), the metal oxide particles contained in the slurry for forming the first catalyst layer 14 used in step (1) more preferably have a particle size D50 of 40 μm or less and a particle size D90 of 80 μm or less, in view of increasing the dispersibility of the catalytically active component.

Likewise, as the particle size of the metal oxide particles contained in the slurry for forming the second catalyst layer 15 used in step (2), the metal oxide particles contained in the slurry for forming the second catalyst layer 15 used in step (2) preferably have a particle size D50 of 1 μm or more and a particle size D90 of 7 μm or more, and more preferably a particle size D50 of 2 μm or more and a particle size D90 of 15 μm or more, in view of easily controlling the value of $I_{B1}/I_A \times 100$ and the value of $I_{B2}/I_A \times 100$ to be within the above-described ranges. With respect to the upper limits of the particle size of the metal oxide particles contained in the slurry for forming the second catalyst layer 15 used in step (2), the metal oxide particles contained in the slurry for forming the second catalyst layer 15 used in step (2) more preferably have a particle size D50 of 40 μm or less and a particle size D90 of 80 μm or less, in view of increasing the dispersibility of the catalytically active component.

Furthermore, in the case where the second catalyst layer 15 includes a lower layer 15A and an upper layer 15B, as the particle size of the metal oxide particles contained in the slurry for forming the lower layer 15A, the metal oxide particles contained in the slurry for forming the lower layer 15A preferably have a particle size D50 of 1 μm or more and a particle size D90 of 7 μm or more, and more preferably a particle size D50 of 2 μm or more and a particle size D90 of 15 μm or more, in view of easily controlling the value of $I_{B1}/I_A \times 100$ and the value of $I_{B2}/I_A \times 100$ to be within the above-described ranges. In view of increasing the dispersibility of the catalytically active component, the metal oxide particles contained in the slurry for forming the lower layer 15A more preferably have a particle size D50 of 40 μm or less and a particle size D90 of 80 μm or less.

Likewise, as the particle size of the metal oxide particles contained in the slurry for forming the upper layer 15B of the second catalyst layer 15, the metal oxide particles contained in the slurry for forming the upper layer 15B of the second catalyst layer 15 preferably have a particle size D50 of 1 µm or more and a particle size D90 of 7 µm or more, and more preferably a particle size D50 of 2 µm or more and a particle size D90 of 15 µm or more, in view of easily controlling the value of $I_{B1}/I_A \times 100$ and the value of $I_{B2}/I_A \times 100$ to be within the above-described ranges. In view of increasing the dispersibility of the catalytically active component, the metal oxide particles contained in the slurry for forming the upper layer 15B more preferably have a particle size D50 of 40 µm or less and a particle size D90 of 80 µm or less.

As used herein, the particle size of the metal oxide particles refers to the particle size of a component that supports the catalytically active component, and in the case where the slurry contains an alumina sol, a zirconia sol, a titania sol, a silica sol, or the like as a binder, the particle size of the metal oxide particles indicates the particle size including the sol.

The particle sizes D50 and D90 of the metal oxide particles may be the particle sizes of the metal oxide particles on which the catalytically active component have been supported, or may be the particle sizes of the metal oxide particles before the catalytically active component is supported. The particle sizes D50 and D90 may be the above-described preferred lower limits or more, or the above-described preferred upper limits or less either before or after the catalytically active component is supported on the metal oxide particles.

The particle sizes D50 and D90 of the metal oxide particles can be measured, for example, in the manner described below. Specifically, an automatic sample feeder for a laser diffraction particle size distribution analyzer (Microtrac SDC available from Microtrac BEL Corporation) is used, metal oxide particles are added to an aqueous solvent, ultrasonic waves of 40 W are applied to the resulting mixture at a flow rate of 40% for 360 seconds, and thereafter the particle size distribution thereof is analyzed using a laser diffraction scattering particle size distribution analyzer (Microtrac MT3300 EXII available from Microtrac BEL Corporation).

Measurement conditions are as follows:
particle's refractive index: 1.5;
particle shape: perfect sphere;
solvent's refractive index: 1.3;
set zero time: 30 seconds; and
measurement time: 30 seconds.

Measurement is performed twice, and the average value is obtained. As the aqueous solvent, pure water is used.

The pore volume of each layer may be tailored by adding a pore-forming material to the slurry for forming the first catalyst layer 14 used in step (1), the slurry for forming the second catalyst layer 15 used in step (2), the slurry for forming the upper layer used in step (2'-1), and the slurry for forming the lower layer used in step (2'-2). As the pore-forming material, cross-linked polymethyl(meth)acrylate particles, cross-linked polybutyl(meth)acrylate particles, cross-linked polystyrene particles, cross-linked polyacrylic acid ester particles, or the like can be used.

With respect to the content of pore-forming material in the slurry, the content of pore-forming material in each of the slurry for forming the first catalyst layer 14, the slurry for forming the second catalyst layer 15, the slurry for forming the upper layer, and the slurry for forming the lower layer is preferably 1 to 40 mass %, and more preferably 5 to 30 mass % relative to the solid content in the slurry. By controlling the content of the pore-forming material to be within the above-described range, an appropriate number of pores with an appropriate size are formed in the first catalyst layer 14 and the second catalyst layer 15. As a result, the PM collection performance and the exhaust gas purification performance realized by the first catalyst layer 14 and the second catalyst layer 15 can be further improved.

In order to apply the slurry for forming the first catalyst layer 14 used in step (1) to the substrate 11, a method may be used in which the upstream side of the substrate 11 in the exhaust gas flow direction is immersed in the slurry. The slurry may be drawn by suction from the downstream side simultaneously with the immersion of the substrate 11 is immersed. In this manner, the slurry for forming the first catalyst layer 14 passes through the opening of the inflow-side cell on the upstream side of the substrate 11 in the X direction and is applied to a surface of the partition wall 23 that faces the inflow-side cell on the upstream side. Due to the particle size of the metal oxide particles described above, at least some of the metal oxide particles that constitute the first catalyst layer 14 are located on the surface of the partition wall 23.

In order to apply the slurry for forming the second catalyst layer 15 used in step (2), the slurry for forming the upper layer used in step (2'-1), and the slurry for forming the lower layer used in step (2'-2) to the substrate 11, a method may be used in which the downstream side of the substrate 11 in the exhaust gas flow direction is immersed in each of the slurries. The slurry may be drawn by suction from the upstream side simultaneously with the immersion of the substrate 11. In this manner, the slurry for forming the second catalyst layer 15 passes through the opening of the outflow-side cell on the downstream side of the substrate 11 in the X direction and is applied to a surface of the partition wall 23 that faces the outflow-side cell on the downstream side. Due to the particle size of the metal oxide particles described above, at least some of the metal oxide particles that constitute the second catalyst layer 15 are located on the surface of the partition wall 23.

The temperature for drying the slurries in steps (1), (2), (2'-1), and (2'-2) is preferably 40 to 120° C., and the temperature for calcining the slurries in steps (1), (2), (2'-1), and (2'-2) is preferably 350 to 550° C.

In the exhaust gas purifying catalyst 10 according to the present embodiment, the amount of coating of the first catalyst layer 14 may be adjusted according to the amount of a catalytically active component used for coating. However, in view of easily controlling the value of $I_{C1}/I_A \times 100$ and the value of $I_{C2}/I_A \times 100$ to be within the above-described ranges, the amount of coating of the first catalyst layer 14 on a dry weight basis is preferably 10 g or more, and more preferably 20 g or more, per liter of volume of the substrate. The amount of coating of the first catalyst layer 14 on a dry weight basis is preferably 60 g or less, and more preferably 50 g or less, per liter of volume of the substrate in view of reducing pressure loss and improving exhaust gas purification performance during high speed driving.

Likewise, the amount of coating of the second catalyst layer 15 may be adjusted according to the amount of a catalytically active component used for coating. However, in view of easily controlling the value of $I_C/I_A \times 100$ and the value of $I_{C2}/I_A \times 100$ to be within the above-described ranges, the amount of coating of the second catalyst layer 15 on a dry weight basis is preferably 20 g or more, and more preferably 30 g or more, per liter of volume of the substrate.

In order to reduce pressure loss, the amount of coating of the second catalyst layer 15 on a dry weight basis is preferably 80 g or less, and more preferably 60 g or less, per liter of volume of the substrate. The mass ratio of the amount of coating of the lower layer 15A to the amount of coating of the upper layer 15B is, for example, preferably 100:10 to 200, and more preferably 100:50 to 150 in view of further improving exhaust gas purification performance.

In the exhaust gas purifying catalyst obtained through the above-described production method, exhaust gas flows into each inflow-side cell 21 of the substrate 11, as shown in FIG. 2. The exhaust gas flowing into the inflow-side cells 21 passes through the porous partition walls 23, and reaches the outflow-side cells 22. In FIG. 2, the routes along which the exhaust gas flowing into the inflow-side cells 21 pass through the partition walls 23 and reach the outflow-side cells 22 are indicated by arrows. Since the partition walls 23 have a porous structure, PM is collected on the surfaces of the partition walls 23 and in the pores formed in the partition walls 23 while the exhaust gas passes through the partition walls 23. Furthermore, since the first catalyst layers 14 and the second catalyst layers 15 are provided on the partition walls 23, the exhaust gas comes into contact with the catalytically active components of the first catalyst layer 14 and the second catalyst layer 15 while the exhaust gas passes through the inside and the surface of the partition wall 23, and thus the toxic components contained in the exhaust gas are purified. Exhaust gas passing through the partition wall 23 and reaching the outflow-side cell 22 flows into the substrate 11 through the opening on the exhaust gas outflow side, and then is discharged to the outside of the exhaust gas purifying catalyst 10.

The exhaust gas purifying catalyst 10 produced in the manner described above can be used in various applications as an exhaust gas purifying catalyst for internal combustion engines that use fossil fuel as a power source, such as gasoline engines, by utilizing the PM collection performance and the exhaust gas purification performance thereof. The present embodiment can also provide an exhaust gas purification method that uses an exhaust gas purifying catalyst 10 as described above. For example, the exhaust gas purifying catalyst 10 may be provided in an exhaust path of an internal combustion engine such as a gasoline engine, in particular, a GDI engine in a vehicle and used as a GPF or the like, and the exhaust gas from the gasoline engine can thus be favorably purified.

EXAMPLES

Hereinafter, the present invention will be described in further detail by way of examples. However, the scope of the present invention is not limited to the examples. Both drying and calcining steps were performed in an atmosphere.

Example 1

1. Preparation of Slurry
First Slurry

A $CeO_2$—$ZrO_2$ solid solution powder with a particle size D50 of 8 μm and a particle size D90 of 22 μm (the $CeO_2$—$ZrO_2$ solid solution contained 15 mass % of $CeO_2$, 70 mass % of $ZrO_2$, and 15 mass % of an oxide of a rare earth element other than Ce) and an alumina powder with a particle size D50 of 8 μm and a particle size D90 of 22 μm were provided. The $CeO_2$—$ZrO_2$ solid solution powder and the alumina powder were mixed at a mass ratio of 84:8, and the mixture was impregnated with an aqueous solution of rhodium nitrate.

Next, the resulting mixed solution was mixed with 25 mass % of a pore-forming material (cross-linked polymethyl (meth)acrylate particles), 3 mass % of an alumina sol, and 5 mass % of a zirconia sol, all relative to the solid content of the mixed solution, and water as a liquid medium, to thereby prepare a first slurry. In the first slurry, rhodium nitrate was contained in an amount of 0.3 mass %, in terms of rhodium metal, relative to the solid content of the first slurry excluding the pore-forming material.

Second Slurry

A $CeO_2$—$ZrO_2$ solid solution powder with a particle size D50 of 8 μm and a particle size D90 of 22 μm (the $CeO_2$—$ZrO_2$ solid solution contained 40 mass % of $CeO_2$, 50 mass % of $ZrO_2$, and 10 mass % of an oxide of a rare earth element other than Ce) and an alumina powder with a particle size D50 of 8 μm and a particle size D90 of 22 μm were mixed at a mass ratio of 60:22, and the mixture was impregnated with an aqueous solution of palladium nitrate.

Next, the resulting mixed solution was mixed with 25 mass % of a pore-forming material (cross-linked polymethyl (meth)acrylate particles), 3 mass % of an alumina sol, and 3 mass % of a zirconia sol, all relative to the solid content of the mixed solution, and water as a liquid medium, to thereby prepare a second slurry. In the second slurry, palladium nitrate was contained in an amount of 3.8 mass %, in terms of palladium metal, relative to the solid content of the second slurry excluding the pore-forming material.

2. Formation of Catalyst Layer

As the substrate 11, a substrate was used that had the structure shown in FIG. 1, included 300 cells/inch$^2$ on a plane perpendicular to the axis direction, each cell being defined by partition walls with a thickness of 200 μm and extending in the axis direction, and had a volume of 1.4 L. For the substrate 11, a log differential pore volume distribution was determined using a later-described method. As a result, a pore volume peak was at a pore size of 18,120 nm, and the log differential pore volume at this peak was $I_A$=1.84 cm$^3$/g. In the substrate 11, the opening of a single inflow-side cell 21 formed in the end face on the inflow-side and the opening of a single outflow-side cell 22 formed in the end face on the outflow-side had roughly the same area.

An upstream end portion of the substrate 11 in the exhaust gas flow direction was immersed in the first slurry, and the slurry was drawn by suction from the downstream side. Then, the substrate was dried at 70° C. for 10 minutes.

A downstream end portion of the dried substrate 11 in the exhaust gas flow direction was immersed in the second slurry, and the slurry was drawn by suction from the upstream side. Then, the substrate was dried at 70° C. for 10 minutes. Next, the downstream end portion of the substrate 11 in the exhaust gas flow direction after the second slurry was dried was immersed in the first slurry, the first slurry was drawn from the upstream side. Then the substrate was dried at 70° C. for 10 minutes to stack an upper layer on each lower layer.

After that, the substrate with the layers was fired at 450° C. for one hour for calcining. Accordingly, an exhaust gas purifying catalyst 10 of Example 1 was obtained. Each obtained first catalyst layer 14 was a single layer, and each second catalyst layer 15 was composed of two layers.

In the exhaust gas purifying catalyst of Example 1, the first catalyst layer 14 of the exhaust gas purifying catalyst 10 was formed on a surface of the partition wall 23 facing the inflow-side cell 21 so as to extend from the upstream end portion R1 toward the downstream side in the exhaust gas flow direction X to 40% of the overall length L, and the amount of coating per volume of the substrate, on a dry weight basis, was 21.6 g/L. The amount of Rh contained in the first catalyst layers 14 per volume of the substrate was 0.065 g/L.

The lower layer 15A and the upper layer 15B of each second catalyst layer 15 of the exhaust gas purifying catalyst 10 were formed on the surface of the partition wall 23 facing the outflow-side cell 22 so as to extend from the downstream end portion R2 toward the upstream side in the exhaust gas flow direction X to 70% of the overall length L. The amount of coating of the lower layers 15A per volume of the substrate, on a dry weight basis, was 26.9 g/L, and that of the upper layers 15B was 12.6 g/L. The amount of Pd contained in the lower layers 15A of the second catalyst layers per volume of the substrate was 1.022/L, and the amount of Rh contained in the upper layers 15B of the second catalyst layers per volume of the substrate was 0.038 g/L.

Example 2

An exhaust gas purifying catalyst was obtained in the same manner as in Example 1, except that the amount of coating of the first catalyst layers 14 was changed to 26.1 g/L, and the amount of coating of the upper layers 15B of the second catalyst layers 15 was changed to 8.1 g/L.

Example 3

An exhaust gas purifying catalyst was obtained in the same manner as in Example 1, except that the amount of coating on the first catalyst layers 14 was changed to 17.1 g/L, and the amount of coating on the upper layers 15B of the second catalyst layers 15 was changed to 17.1 g/L.

Example 4

An exhaust gas purifying catalyst was obtained in the same manner as in Example 1, except for the following.

As the substrate 11, a substrate was used that had the structure shown in FIG. 1, included 300 cells/inch$^2$ on a plane perpendicular to the axis direction, each cell being defined by partition walls with a thickness of 250 m and extending in the axis direction, had a volume of 1.4 L, and had an average pore size different from that of the substrate used in Example 1. For the substrate 11, a log differential pore volume distribution was determined using a method which will be described later, and a pore volume peak was at a pore size of 16,469 nm, and the log differential pore volume at this peak was $L_4$=1.72 cm$^3$/g.

A pore-forming material was not added to the first slurry or the second slurry.

Furthermore, the amount of coating of the first catalyst layers 14 was changed to 25.1 g/L, the amount of coating of the lower layers 15A of the second catalyst layers 15 was changed to 23.9 g/L, and the amount of coating on the upper layers 15B of the second catalyst layers 15 was changed to 12.1 g/L.

Example 5

An exhaust gas purifying catalyst was obtained in the same manner as in Example 4, except for the following.

The amount of pore-forming material contained in the first slurry was changed to 10 mass' relative to the solid content of the mixed solution containing the $CeO_2$—$ZrO_2$ solid solution powder and the alumina powder, and the amount of pore-forming material contained in the second slurry was changed to 25 mass % relative to the solid content of the mixed solution containing the $CeO_2$—$ZrO_2$ solid solution powder and the alumina powder.

Example 6

An exhaust gas purifying catalyst was obtained in the same manner as in Example 5, except that in the first slurry and the second slurry, a $CeO_2$—$ZrO_2$ solid solution powder with a particle size D50 of 2 μm and a particle size D90 of 7 μm, and an alumina powder with a particle size D50 of 2 μm and a particle size D90 of 7 μm were used.

Example 7

An exhaust gas purifying catalyst was obtained in the same manner as in Example 5, except that in the first slurry and the second slurry, a $CeO_2$—$ZrO_2$ solid solution powder with a particle size D50 of 14 μm and a particle size D90 of 42 μm, and an alumina powder with a particle size D50 of 14 μm and a particle size D90 of 42 m were used.

Example 8

An exhaust gas purifying catalyst was obtained in the same manner as in Example 1, except for the following.

The amount of pore-forming material contained in the first slurry was changed to 10 mass % relative to the solid content of the mixed solution containing the $CeO_2$—$ZrO_2$ solid solution powder and the alumina powder, and the amount of pore-forming material contained in the second slurry was changed to 10 mass % relative to the solid content of the mixed solution containing the $CeO_2$—$ZrO_2$ solid solution powder and the alumina powder.

In the first slurry, palladium nitrate was used instead of rhodium nitrate.

In the second slurry, rhodium nitrate was used instead of palladium nitrate.

The upper layer 15B of the second catalyst layer 15 was not formed. The amount of coating of the first catalyst layers 14 was changed to 25.2 g/L. The amount of coating of the second catalyst layers 15 was changed to 45.9 g/L, the coating being formed of the second slurry.

In the obtained exhaust gas purifying catalyst, the amount of Pd contained in the first catalyst layers 14 per the volume of the substrate was 0.075 g/L, and the amount of Rh contained in the second catalyst layers 15 per the volume of the substrate was 1.744 g/L.

Comparative Example 1

An exhaust gas purifying catalyst was obtained in the same manner as in Example 8, except for the following.

The amount of pore-forming material contained in the first slurry was changed to 25 mass % relative to the solid content of the mixed solution containing the $CeO_2$—$ZrO_2$ solid solution powder and the alumina powder. On the other hand, any pore-forming material was not added to the second slurry.

The mass ratio of the $CeO_2$—$ZrO_2$ solid solution powder and the alumina powder in the first slurry was changed to 3:1, and the mass ratio of the $CeO_2$—$ZrO_2$ solid solution powder and the alumina powder in the second slurry was changed to 7:1.

The amount of coating of the first catalyst layers 14 was changed to 10.0 g/L. The amount of coating of the second catalyst layers 15 was changed to 50.0 g/L, the coating being formed of the second slurry.

In the obtained exhaust gas purifying catalyst, the amount of Pd contained in the first catalyst layers 14 per volume of the substrate was 0.030 g/L, and the amount of Rh contained in the second catalyst layers 15 per volume of the substrate was 1.9 g/L.

Comparative Example 2

An exhaust gas purifying catalyst was obtained in the same manner as in Comparative Example 1, except that any pore-forming material was not added to the first slurry, and that in the first slurry, the mass ratio of the $CeO_2$—$ZrO_2$ solid solution powder and the alumina powder was changed to 1:1.

Measurement of Pore Volume

According to the method described hereinbefore, 1 cm$^3$ cubes (cubes with each side having a length of 1 cm) as upstream samples were prepared from each of the catalysts of Examples and Comparative Examples by cutting out a portion of the partition walls 23 at a position spaced apart from the upstream end portion R1 of the exhaust gas purifying catalyst 10 toward the downstream side by a distance corresponding to 10% of the overall length L of the substrate 11. Likewise, 1 cm$^3$ cubes (cubes with each side having a length of 1 cm) as downstream samples were prepared from each of the catalysts of Examples and Comparative Examples by cutting out from a portion of the partition walls 23 at a position spaced apart from the downstream end portion R2 toward the upstream side by a distance corresponding to 10% of the overall length L.

Then, from the results, $I_A$, $I_{B1}$, $I_{B2}$, $I_{C1}$, and $I_{C2}$ were determined, and $I_{B1}/I_A \times 100(\%)$, $I_{B2}/I_A \times 100(\%)$, $I_{C1}/I_A \times 100(\%)$, and $I_{C2}/I_A \times 100(\%)$ were calculated. The obtained values are shown in Table 1.

Specific measurement conditions were as follows.

Determination of Log Differential Pore Volume Distribution of Exhaust Gas Purifying Catalyst As the measurement apparatus, an automated porosimeter AutoPore IV 9520 available from Shimadzu Corporation was used, and measurement was performed using the following conditions and procedure.

Measurement Conditions

Measurement Environment: 25° C.

Measurement Cell: sample chamber volume 3 cm$^3$, intrusion volume 0.39 cm$^3$

Measurement Range: 0.0048 MPa to 255.106 MPa

Measurement Point: 131 points (points were equidistantly spaced when pore size was logarithmically transformed)

Intrusion volume: adjusted to 25% or more and 80% or less

Low Pressure Parameters

Exhaust pressure: 50 μmHg

Exhaust time: 5.0 min

Mercury injection pressure: 0.0034 MPa

Equilibrium time: 10 sec

High Pressure Parameter

Equilibrium time: 10 sec

Mercury Parameters

Advancing contact angle: 130.0 degrees

Receding contact angle: 130.0 degrees

Surface tension: 485.0 mN/m (485.0 dyne/cm)

Mercury density: 13.5335 g/mL

Measurement Procedure (1) Measurement was performed at 46 points in a low-pressure range at a pressure of 0.0048 MPa to 0.2068 MPa.

(2) Measurement was performed at 85 points in a high-pressure range at a pressure of 0.2241 MPa to 255.1060 MPa.

(3) A pore volume distribution was determined through a calculation from the data of the mercury injection pressure and the amount of mercury injected.

Steps (1), (2), and (3) described above were performed automatically by an accompanying software of the apparatus. Other conditions were conformed to JIS R 1655:2003.

In a log differential pore volume distribution determined on the first catalyst layers 14 and the partition walls 23 for determination of $I_{B1}$ and $I_{C1}$, the maximum peak in a measurement range of a pore size of 1 to 1,000,000 nm was observed within the first range of 10,000 to 100,000 nm, and the maximum peak in a measurement range of a pore size of 1 to 2,000 nm was observed within the second range of 20 to 500 nm, in each Example. Furthermore, a peak was also observed in a range of 2,000 to 10,000 nm. Likewise, in a log differential pore volume distribution determined on the second catalyst layers 15 and the partition walls 23 for determination of $I_{B2}$ and $I_{C2}$, the maximum peak in a measurement range of a pore size 1 to 1,000,000 nm was observed within the first range of 10,000 to 100,000 nm, and the maximum peak in a measurement range of a pore size of 1 to 2,000 nm was observed within the second range of 20 to 500 nm, in each Example. Furthermore, a peak was also observed within the range of 2,000 to 10,000 nm.

PM Collection Performance

A vehicle in which the exhaust gas purifying catalyst 10 was included was driven in accordance with the driving conditions of the Worldwide Harmonized Light Vehicles Test Cycles (WLTC). The number of PM particles contained in the exhaust gas passing through the exhaust gas purifying catalyst 10, $PN_{cat}$, was counted for each of the following periods: a low speed driving period (from 0 to 589 seconds after the start of driving); a medium speed driving period (from 589 seconds to 1022 seconds after the start of driving); a high speed driving period (from 1022 seconds to 1477 seconds after the start of driving); and an extra-high speed driving period (from 1477 seconds to 1800 seconds after the start of driving). The number of PM particles discharged directly from the engine, $PN_{all}$, was also counted. The PM collection rate was determined by the following equation. The results are shown in Table 1.

$$\text{PM collection rate (\%)} = 100 - (PN_{cat}/PN_{all}) \times 100$$

Conditions for determining PM Collection Rate

Vehicle used for evaluation: 1.5 L gasoline direct injection turbo engine

Gasoline used: fuel for verification test

Apparatus for counting PM: apparatus for counting PM available from HORIBA, Ltd.

Measurement of Amount of $NO_x$ Emitted

Each of the exhaust gas purifying catalysts of Examples and Comparative Examples was placed in an exhaust path of the engine, and the engine with the exhaust gas purifying catalyst were each exposed to the following degradation conditions for a durability test comparable to driving 100,000 to 200,000 kilometers.

Degradation Conditions

Engine used for durability test: 2 L NA gasoline engine for passenger vehicles

Gasoline used: commercially available regular gasoline

Temperature and time used for degradation: 900° C., 100 hrs.

After performing the durability test under the above-described conditions, each of the exhaust gas purifying catalysts that had undergone the durability test was installed in a vehicle described below. Next, the vehicle was driven in accordance with the driving conditions of the Worldwide harmonized Light vehicles Test Cycles (WLTC). The amount emitted (emission value) of nitrogen oxide ($NO_x$) contained in the exhaust gas passing through the exhaust gas purifying catalyst 10 was measured for each of the following periods: a low speed driving period (from 0 to 589 seconds after the start of driving); a medium speed driving period (from 589 seconds to 1022 seconds after the start of driving); a high speed driving period (from 1022 seconds to 1477 seconds after the start of driving); and an extra-high speed driving period (from 1477 seconds to 1800 seconds after the start of driving). The results are shown in Table 1. The amount of $NO_x$ emitted was measured only on the exhaust gas purifying catalysts of Examples 1 to 4 and 8, and Comparative Examples 1 and 2.

Conditions for Determining Purification Rate
Vehicle used for evaluation: 1.5 L gasoline direct injection turbo engine
Gasoline used: fuel for verification test
Apparatus for Analyzing Exhaust gas: available from HORIBA, Ltd.

TABLE 1

| | | First catalyst layer | | | Second catalyst layer Lower layer | Second catalyst layer Upper layer | | | Evaluation | | | | | | |
|---|---|---|---|---|---|---|---|---|---|---|---|---|---|---|---|
| | Substrate $I_A$ | Catalytically active component | $I_{B1}$ | $I_{C1}$ | Catalytically active component | Catalytically active component | $I_{B2}$ | $I_{C2}$ | $I_{B1}/I_A \times 100$ [%] | $I_{B2}/I_A \times 100$ [%] | $I_{C1}/I_A \times 100$ [%] | $I_{C2}/I_A \times 100$ [%] | $I_{B1}/I_{B2} \times 100$ [%] | PM collection rate [%] | Amount of $NO_x$ emitted [mg/km] |
| Ex. 1 | 1.842 | Rh | 1.324 | 0.085 | Pd | Rh | 1.338 | 0.151 | 71.9 | 72.7 | 4.6 | 8.2 | 98.9 | 88.9 | 7.7 |
| Ex. 2 | | Rh | 1.327 | 0.127 | Pd | Rh | 1.378 | 0.146 | 72.1 | 74.8 | 6.9 | 7.9 | 96.3 | 86.7 | 8.3 |
| Ex. 3 | | Rh | 1.334 | 0.085 | Pd | Rh | 1.332 | 0.151 | 72.4 | 72.3 | 4.6 | 8.2 | 100.1 | 89.9 | 8.3 |
| Ex. 4 | 1.720 | Rh | 1.250 | 0.170 | Pd | Rh | 1.385 | 0.123 | 72.7 | 80.5 | 9.9 | 7.2 | 90.3 | 93.0 | 7.6 |
| Ex. 5 | | Rh | 1.704 | 0.160 | Pd | Rh | 1.761 | 0.105 | 99.1 | 102.4 | 9.3 | 6.1 | 96.7 | 93.0 | — |
| Ex. 6 | | Rh | 1.515 | 0.111 | Pd | Rh | 1.753 | 0.107 | 88.1 | 101.9 | 6.4 | 6.2 | 86.5 | 88.0 | — |
| Ex. 7 | | Rh | 1.707 | 0.156 | Pd | Rh | 1.850 | 0.110 | 99.3 | 107.6 | 9.1 | 6.4 | 92.3 | 85.0 | — |
| Ex. 8 | 1.842 | Pd | 1.393 | 0.203 | Rh | — | 1.150 | 0.160 | 75.6 | 62.4 | 11.0 | 8.7 | 121.1 | 85.0 | 9.4 |
| Comp. Ex. 1 | | Pd | 1.503 | 0.034 | Rh | — | 0.628 | 0.139 | 81.6 | 34.1 | 1.9 | 7.6 | 239.3 | 77.3 | 9.1 |
| Comp. Ex. 2 | | Pd | 1.564 | 0.012 | Rh | — | 0.811 | 0.149 | 84.9 | 44.0 | 0.6 | 8.1 | 192.9 | 74.2 | 11.4 |

As shown in Table 1, the PM collection rate is high in Examples, in which $I_{B1}/I_A \times 100 \geq 60\%$, $I_{B2}/I_A \times 100 \geq 60\%$, $I_{C1}/I_A \times 100 \geq 3\%$, and $I_{C2}/I_A \times 100 \geq 3\%$ are satisfied. In contrast, the PM collection rate is low in Comparative Examples 1 and 2, in which $I_{B2}/I_A \times 100 \geq 60\%$ or $I_{C1}/I_A \times 100 \geq 3\%$ is not satisfied. The amount of $NO_x$ emitted is relatively large (greater than 9 mg/km) in Example 8 and Comparative Example 1, in which the first catalyst layer 14 and the second catalyst layer 15 of a single layer contain Pd and Rh, respectively. In contrast, the amount of $NO_x$ emitted is reduced to 8.3 mg/km or less in Examples 1 to 4, in which the first catalyst layer 14, the lower layer of the second catalyst layer 15, and the upper layer of the second catalyst layer 15 contain Rh, Pd, and Rh, respectively, and thus it can be seen that the $NO_x$ purification performance can be improved by such a configuration. Also, the pressure loss was low in the exhaust gas purifying catalysts in Examples.

LIST OF REFERENCE NUMERALS

10 Exhaust gas purifying catalyst
11 Substrate
14 First catalyst layer
15 Second catalyst layer
21 Inflow-side cell
22 Outflow-side cell
23 Partition wall

The invention claimed is:

1. An exhaust gas purifying catalyst comprising: a substrate and catalyst portions provided in the substrate,
the substrate including:
inflow-side cells, each inflow-side cell being a space having an open end on an inflow side thereof and a closed end on an outflow side thereof in an exhaust gas flow direction;
outflow-side cells, each outflow-side cell being a space having a closed end on an inflow-side thereof and an open end on an outflow side thereof in the exhaust gas flow direction; and
porous partition walls, each partition wall separating the inflow-side cell from the outflow-side cell, and
the catalyst portions including:
(group A) first catalyst portions, each first catalyst portion being provided at least on a part of a surface of the partition wall that faces the inflow-side cell on an upstream side in the exhaust gas flow direction; and
(group B) second catalyst portions, each second catalyst portion being provided at least on a part of a surface of the partition wall that faces the outflow-side cell on a downstream side in the exhaust gas flow direction,
wherein the catalyst includes a first region and a second region in the exhaust gas flow direction,
in the first region, the first catalyst portions are provided on the partition walls and the second catalyst portion is not provided, and in the second region, the second catalyst portions are provided on the partition walls and the first catalyst portion is not provided, a pore volume distribution with respect to a pore size satisfies the following expressions, as determined on the substrate and the catalyst:

$I_{B1}/I_A \times 100 \geq 60(\%)$; $I_{B2}/I_A \times 100 \geq 60(\%)$; $I_{C1}/I_A \times 100 \geq 3(\%)$; and $I_{C2}/I_A \times 100 \geq 3(\%)$, and at least one of $I_{C1}/I_A \times 100$ and $I_{C2}/I_A \times 100$ is 4.5(%) or more, wherein, $I_A$ represents a log differential pore volume of a maximum peak within a first range of a pore size of 10,000 to 100,000 nm, as determined on the partition walls of the substrate, $I_{B1}$ represents a log differential pore volume of a maximum peak within the first range, as determined on the first catalyst portions and the partition walls in the first region in the catalyst, $I_{B2}$ represents a log differential pore volume of a maximum peak within the first range, as determined on the second catalyst portions and the partition walls in the second region in the catalyst, $I_{C1}$ represents a log differential pore volume of a maximum peak within a second range of a pore size of 20 to 500 nm, as determined on the first catalyst portions and the partition walls in the first region in the catalyst, and $I_{C2}$ represents a log differential pore volume of a maximum peak within the second range, as determined on the second catalyst portions and the partition walls in the second region in the catalyst.

2. The exhaust gas purifying catalyst according to claim 1, wherein the first catalyst portions and the second catalyst portions each independently contain at least one catalytically active component selected from Pt, Pd, and Rh.

3. The exhaust gas purifying catalyst according to claim 1, wherein each catalyst portion of at least one of group A and group B has a stack structure including an upper layer and a lower layer, and the upper layer and the lower layer each contain catalytically active components that are different from each other or the same.

4. The exhaust gas purifying catalyst according to claim 1, wherein the first catalyst portion contains Rh as the catalytically active component, and the second catalyst portion has a stack structure including an upper layer and a lower layer, the lower layer containing Pd as the catalytically active component, and the upper layer containing Rh as the catalytically active component.

5. An exhaust gas purification method that uses the exhaust gas purifying catalyst according to claim 1.

* * * * *